US010732911B2

(12) United States Patent
Tsuchiya

(10) Patent No.: US 10,732,911 B2
(45) Date of Patent: Aug. 4, 2020

(54) INFORMATION PROCESSING APPARATUS, INFORMATION PROCESSING METHOD, AND STORAGE MEDIUM, THAT INCLUDE A WIRELESS CONNECTION REQUEST BLOCKING FEATURE

(71) Applicant: CANON KABUSHIKI KAISHA, Tokyo (JP)

(72) Inventor: Masato Tsuchiya, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/982,379

(22) Filed: May 17, 2018

(65) Prior Publication Data

US 2018/0341443 A1 Nov. 29, 2018

(30) Foreign Application Priority Data

May 24, 2017 (JP) .................. 2017-102564

(51) Int. Cl.
*G06F 3/12* (2006.01)
*H04N 1/00* (2006.01)
(Continued)

(52) U.S. Cl.
CPC .......... *G06F 3/1236* (2013.01); *G06F 3/1231* (2013.01); *G06F 3/1292* (2013.01); *H04N 1/00307* (2013.01); *H04N 1/00408* (2013.01); *H04N 1/32117* (2013.01); *H04W 12/08* (2013.01); *H04L 63/101* (2013.01); *H04L 63/1466* (2013.01); *H04N 2201/0094* (2013.01); *H04N 2201/3205* (2013.01); *H04W 12/00512* (2019.01); *H04W 12/1202* (2019.01); *H04W 84/12* (2013.01)

(58) Field of Classification Search
None
See application file for complete search history.

(56) References Cited

U.S. PATENT DOCUMENTS

| 9,148,747 | B2 | 9/2015 | Tanji |
| 9,723,134 | B1* | 8/2017 | Davis .................. H04M 3/367 |
| 2017/0280020 | A1* | 9/2017 | Ishimura ............ H04N 1/00307 |

FOREIGN PATENT DOCUMENTS

JP 2014165593 A 9/2014

* cited by examiner

*Primary Examiner* — Thomas D Lee
(74) *Attorney, Agent, or Firm* — Rossi, Kimms & McDowell LLP

(57) ABSTRACT

When establishing a connection with an external apparatus for wireless communication, an information processing apparatus suppresses the connection establishment based on an unauthorized connection request, by determining whether or not information showing a name of the external apparatus included in each of a plurality of received wireless connection requests in a state capable of accepting the wireless connection request is the same, determining whether or not apparatus intrinsic information included in each of the plurality of received wireless connection requests in the state capable of accepting the wireless connection request is the same, and shifting, in a case where it is determined that the information showing the name of the external apparatus is the same and it is determined that the apparatus intrinsic information is not the same, the information processing apparatus to a state incapable of accepting the wireless connection request.

6 Claims, 6 Drawing Sheets

(51) Int. Cl.
*H04N 1/32* (2006.01)
*H04W 12/08* (2009.01)
*H04W 12/00* (2009.01)
*H04L 29/06* (2006.01)
*H04W 12/12* (2009.01)
*H04W 84/12* (2009.01)

INFORMATION PROCESSING APPARATUS, INFORMATION PROCESSING METHOD, AND STORAGE MEDIUM, THAT INCLUDE A WIRELESS CONNECTION REQUEST BLOCKING FEATURE

BACKGROUND OF THE INVENTION

Field of the Invention

The present invention relates to an information processing apparatus, an information processing method, and a storage medium.

Description of the Related Art

In recent years, many home appliances and office business equipment have a wireless communicating function and can be connected to an in-house LAN (local area network) or Internet by using the wireless communicating function. This is true of an image forming apparatus such as printer, multi-function machine, or the like. Such a demand that a mobile terminal or a laptop computer is connected to the image forming apparatus in a wireless manner and a print job is input to the image forming apparatus or an equipment setting of the image forming apparatus is made from the mobile terminal or the laptop computer is increasing.

Different from wired communication, in wireless communication, since a physical layer medium has wave characteristics of diffusion and diffraction based on a Huygens' and Fresnel's principle, it is difficult to transmit a signal only to a specific information processing apparatus. Therefore, in the wireless communication, a further high countermeasure is necessary to a security risk such as wiretapping, spoofing, or the like. For this purpose, many security techniques such as authentication and encryption have been invented.

There are several kinds of connection authentication systems. One of them is such a system that the user inputs a character train like a password to one of wireless terminals. As examples of such a system, there are an authentication by a network identifier (SSID (service set identifier)) and passphrase which has been standardized by the IEEE (Institute of Electrical and Electronics Engineers) 802.11, an authentication by inputting a PIN (personal identification number) code in Bluetooth™ communication, and the like.

Another one is such a system that a connecting operation is performed in both wireless terminals connected in a wireless manner. As examples of such a system, there are an authentication of a push button type of WPS (Wi-Fi™ Protected Setup) or Wi-Fi Direct™, Numerical Comparison which has been standardized by Bluetooth™ 4.2, and the like. According to the latter, such an operation that a coincidence between numerals displayed on both of the wireless terminals is confirmed and the user authenticates a connection of both of the wireless terminals is performed.

Such a constitution that identification information of an external apparatus specified as a connection destination of Wi-Fi Direct™ is displayed and the user is inquired about whether or not a wireless connection of Wi-Fi Direct™ to the external apparatus is established is disclosed in Japanese Patent Application Laid-Open No. 2014-165593.

In the authentication of such a system that the operation for connection is performed in both of the wireless terminals, since there is no need to input a character train such as a password or the like, the unauthorized user spoofs (pretends) to be an authorized user and can establish a connection of the wireless terminal. Ordinarily, when the wireless terminals make a P2P (peer-to-peer) connection by themselves, each wireless terminal includes its own identification information into a signal for notifying the partner terminal of its own existence and transmits such a signal to the wireless terminal as a connection target. Therefore, when it is intended that the wireless terminal of the authorized user is connected to a certain wireless terminal, the unauthorized user can know the identification information of the wireless terminal of the authorized user. To prevent such a situation, if the unauthorized user sets the identification information of his own wireless terminal to the same identification information as that of the authorized user and sends a connection request to the wireless terminal as a connection target, a confirmation display of the same contents as those in the case where there is a connection request from the wireless terminal of the authorized user is performed. Consequently, if the authorized user decides that permission or refuse of the connection request by his own wireless terminal is made in such a confirmation display and performs the operation to permit the connection in the confirmation display, the connection to the wireless terminal of the unauthorized user is permitted.

SUMMARY OF THE INVENTION

According to an aspect of the present invention, there is provided an information processing apparatus which comprises a receiving unit configured to receive a wireless connection request from an external apparatus; a connecting unit configured to make a wireless connection to the external apparatus based on the wireless connection request received by the receiving unit; a first determining unit configured to determine whether or not information which shows a name of the external apparatus and is included in each of the plurality of wireless connection requests received by the receiving unit in a state where the information processing apparatus can accept the wireless connection request is the same; and a second determining unit configured to determine whether or not apparatus intrinsic information included in each of the plurality of wireless connection requests received by the receiving unit in the state where the information processing apparatus can accept the wireless connection request is the same, wherein, in a case where it is determined by the first determining unit that the information showing the name of the external apparatus is the same and it is determined by the second determining unit that the apparatus intrinsic information is not the same, the information processing apparatus is shifted to a state where the wireless connection request is not accepted.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings. Although there are generally several embodiments in the wireless connection, in the embodiment, a case of performing wireless communication in P2P without passing through a secure fundamental network such as an in-house LAN will be described as an example. In the embodiment, Wi-Fi Direct™ will be mainly described as an example of the P2P connection.

<System Configuration>

Figure 1:
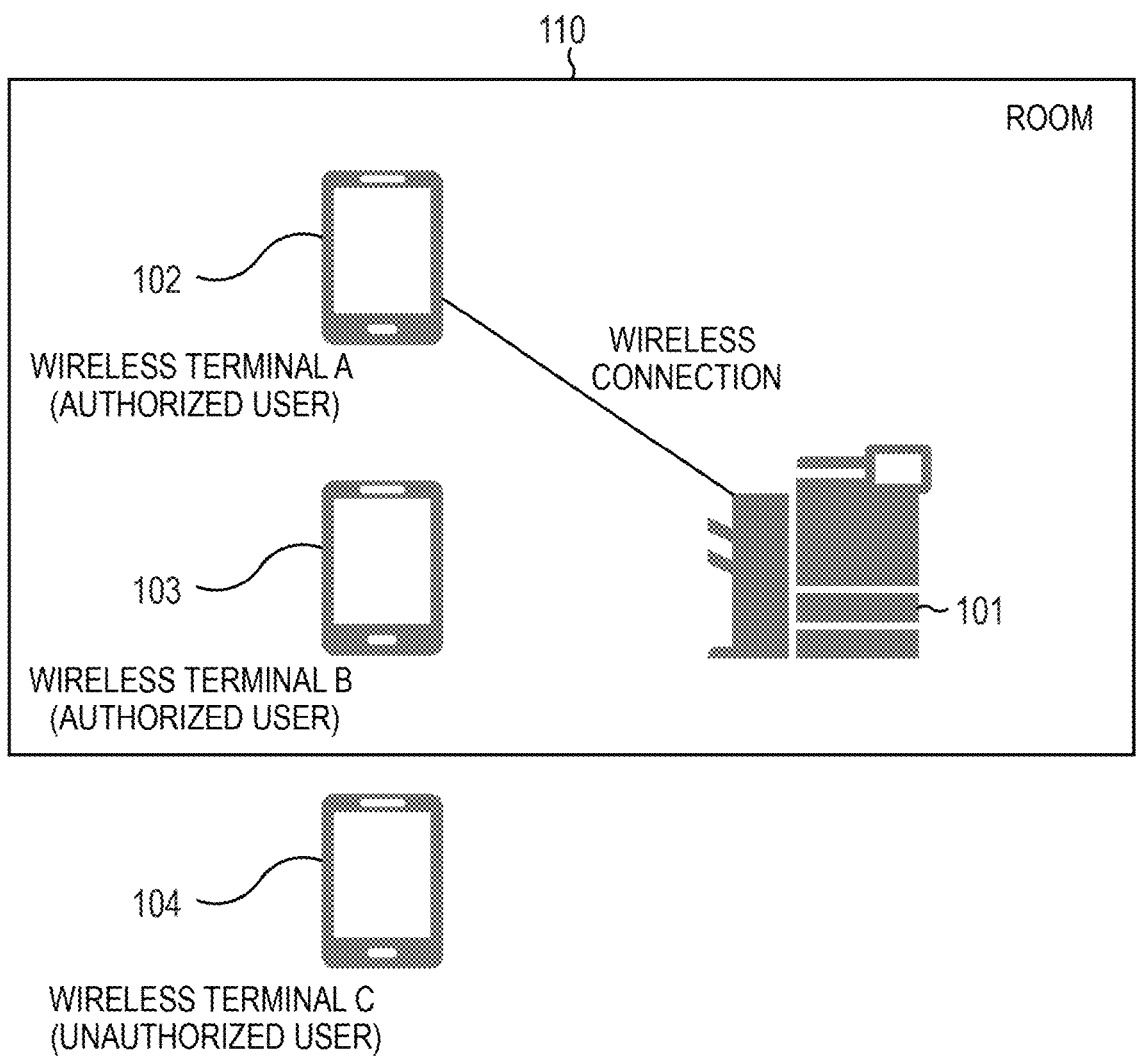
FIG. 1 is a diagram illustrating a configuration of an information processing system.

An example of a configuration of an information processing system 100 according to the embodiment will be described with reference to FIG. 1.

In an environment in the embodiment, an MFP 101 having a wireless communicating function, a wireless terminal 102 (wireless terminal A), a wireless terminal 103 (wireless terminal B), and a wireless terminal 104 (wireless terminal C) exist. The wireless terminals 102, 103, and 104 are wireless terminals which intend to establish a connection to the MFP 101 in a wireless manner by Wi-Fi Direct™ without passing through an access point (for example, without passing through an environment of the in-house LAN). As mentioned above, in the embodiment, it is assumed that the MFP 101 and the wireless terminals 102, 103, and 104 support Wi-Fi Direct™.

The MFP 101 and the wireless terminals 102 and 103 among the MFP 101 and the wireless terminals 102 to 104 exist in a same room 110 in an office building or the like. It is assumed that the users who operate the wireless terminals 102 and 103 are the authorized users who got a permission of an in-house network administrator. On the other hand, it is assumed that the user who operates the wireless terminal 104 is the unauthorized user who intends to establish a connection to the MFP 101 from an outside or the like of the office building. In the embodiment, a case where one of the wireless communicating apparatuses which are connected by Wi-Fi Direct™ is an MFP (image forming apparatus) will be described as an example. However, the wireless communicating apparatus is not limited to the MFP but may be a personal computer, a mobile terminal, or the like. In the embodiment, for example, an example of an information processing apparatus is realized by using the MFP 101 and an example of an external apparatus is realized by using the wireless terminals 102 to 104.

<Hardware Constitution of MFP 101>

Subsequently, an example of a hardware constitution of the MFP 101 according to the embodiment will be described with reference to FIG. 2.

A CPU (central processing unit) 211 controls the operation of the whole MFP 101. The CPU 211 reads out a control program stored in a ROM (read only memory) 212 and performs various kinds of control such as reading control, transmission control, and the like. A RAM (random access memory) 213 is a volatile memory which is used by the CPU 211 as a work area or the like for executing various kinds of programs. An HDD (hard disk drive) 214 stores image data and the various kinds of programs. An operation unit 215 has a display which operates as a touch panel which can be operated by a finger of the user. The operation unit 215 may have hardware keys (buttons, switches, and the like).

A printer 216 prints the image data transferred through an internal bus onto paper. A scanner 217 optically reads an image on an original and generates image data. A first communication I/F (interface) 218 is an interface for making wireless communication by the Bluetooth™ standard and mutually communicates with other equipment having a Bluetooth™ I/F. In the embodiment, the MFP 101 mutually communicates with a mobile terminal by the Bluetooth™ standard. A second communication I/F 219 and a third communication I/F 220 are NIC (Network Interface Cards) for connecting to a network in a wireless manner (Wi-Fi™) and a wired manner (Ethernet™).

Figure 2:
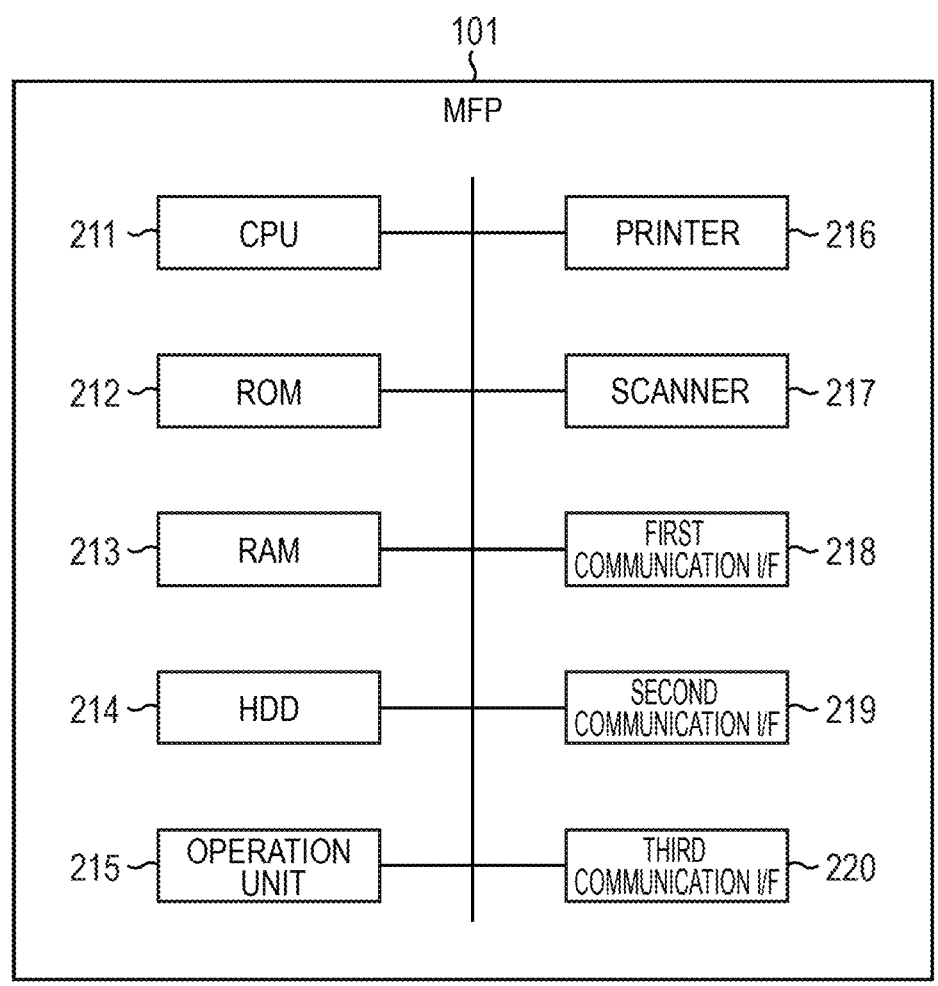
FIG. 2 is a diagram illustrating a hardware constitution of an MFP (multi-function peripheral).

The hardware (CPU 211 to third communication I/F 220) illustrated in FIG. 2 are mutually connected by the internal bus and can mutually exchange data.

The RAM 213 holds data storage for performing wireless communication control. By the data storage, the following information regarding the wireless terminal currently receiving a connection request is held in the RAM 213.

1. MAC (Media Access Control) address

2. Identification name (Wi-Fi Direct™ device name)

In the embodiment, it is assumed that an MAC address cannot be changed by the user of the wireless terminal. It is also possible to construct in such a manner that the MAC address can be changed, for example, on the vendor side of the wireless terminal. It is also assumed that the Wi-Fi Direct™ device name can be changed by the user of the wireless terminal. In the embodiment, an example of first information (information which cannot be changed by the user of the external apparatus (identification information of the external apparatus)) is realized by using, for example, the MAC address. An example of second information (information which can be changed by the user of the external apparatus (identification information of the external apparatus)) is realized by using, for example, the Wi-Fi Direct™ device name.

The HDD 214 holds a list of the MAC addresses as shown in the following TABLE 1 in which the connection in Wi-Fi Direct™ is permitted (hereinbelow; such a list is called a connection permission list). An MAC address of a wireless terminal which is intended to be connected to the MFP 101 is preliminarily registered into such a connection permission list by the user (for example, administrator user). As will be described hereinafter in a flowchart of FIG. 4, an MAC address of a wireless terminal is automatically added to the connection permission list. Therefore, it is not always necessary to perform the foregoing previous registration of the MAC address into the connection permission list. In the embodiment, for example, by registering the MAC address into the connection permission list stored in the HDD 214 by using the CPU 211, an example of a registration unit for registering the first information of the external apparatus into a storage medium is realized.

TABLE 1

| Permitted MAC Address |
| --- |
| XX:XX:XX:XX:XX:XX |
| YY:YY:YY:YY:YY:YY |

In the embodiment, it is assumed that MAC addresses of the three wireless terminals 102 to 104 (wireless terminals A to C) and identification names (Wi-Fi Direct™ device names) have been set as shown in the following TABLE 2.

TABLE 2

|  | MAC Address | Identification Name |
|---|---|---|
| Wireless Terminal A | AA:AA:AA:AA:AA:AA | Mobile Device A |
| Wireless Terminal B | BB:BB:BB:BB:BB:BB | Mobile Device B |
| Wireless Terminal C | CC:CC:CC:CC:CC:CC | Mobile Device C |

It is assumed that the wireless terminal 104 (wireless terminal C) is used by the unauthorized user who intends to connect to the MFP 101 by spoofing (pretending) to be the wireless terminal 103 (wireless terminal B). Therefore, the identification name of the wireless terminal 104 (wireless terminal C) is set to the same name as that of the wireless terminal 103 (wireless terminal B).

<Software Configuration of MFP 101>

Figure 3:
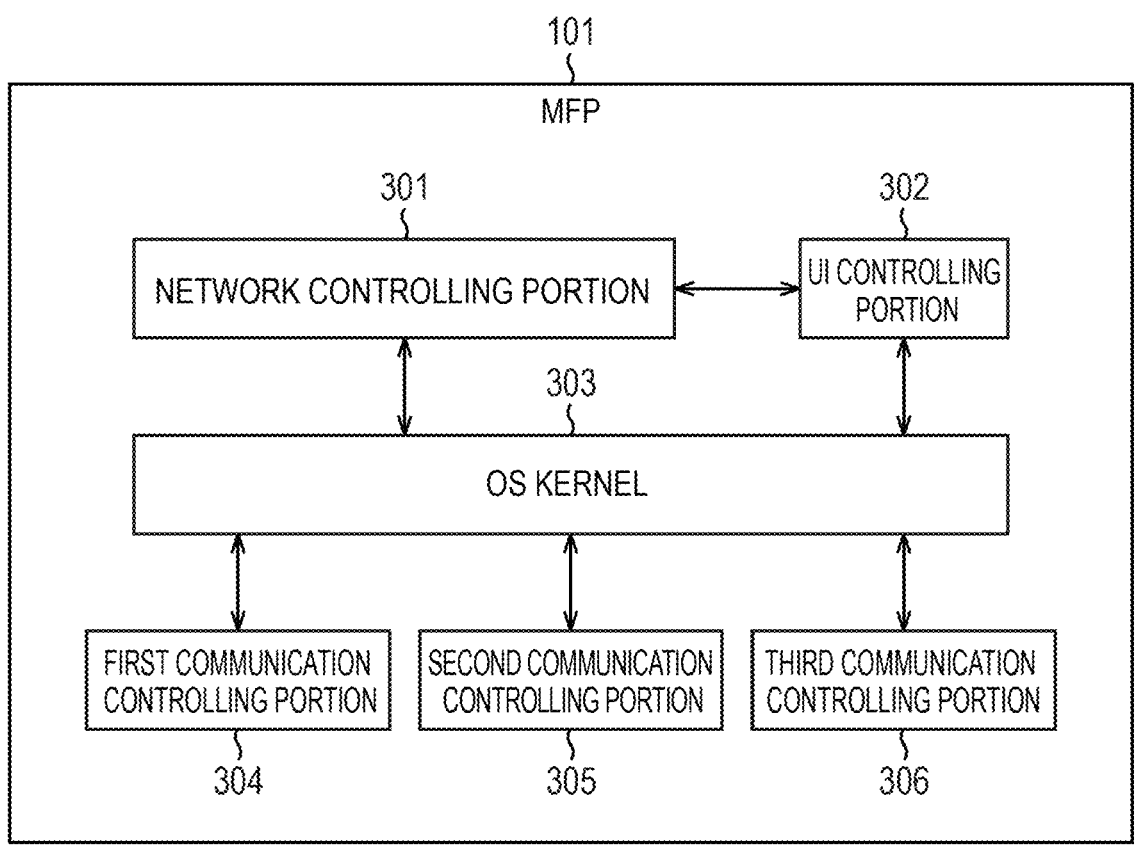
FIG. 3 is a diagram illustrating a software configuration of the MFP.

Subsequently, an example of a software configuration of the MFP 101 in the embodiment will be described with reference to FIG. 3. FIG. 3 is a block diagram illustrating an example of the software configuration of the MFP 101.

A first communication controlling portion 304 is a module for controlling the first communication I/F 218. A second communication controlling portion 305 is a module for controlling the second communication I/F 219. Similarly, a third communication controlling portion 306 is a module for controlling the third communication I/F 220. Those modules are controlled by an OS (operating system) kernel 303.

A network controlling portion 301 operates the communication controlling portions (the first communication controlling portion 304, the second communication controlling portion 305, and the third communication controlling portion 306) of Bluetooth™, Wi-Fi™, Ethernet™ through the OS kernel 303. The network controlling portion 301 manages current network settings and manages whether or not a communication form of each of Ethernet™ (wired LAN), wireless LAN, and wireless P2P connection is valid. The network controlling portion 301 communicates information with a UI (user interface) controlling portion 302 and changes a display of a UI, or contrarily performs network control in response to an operation request from the UI.

<Flow in which MFP 101 Performs Spoofing Process>

Figure 4:
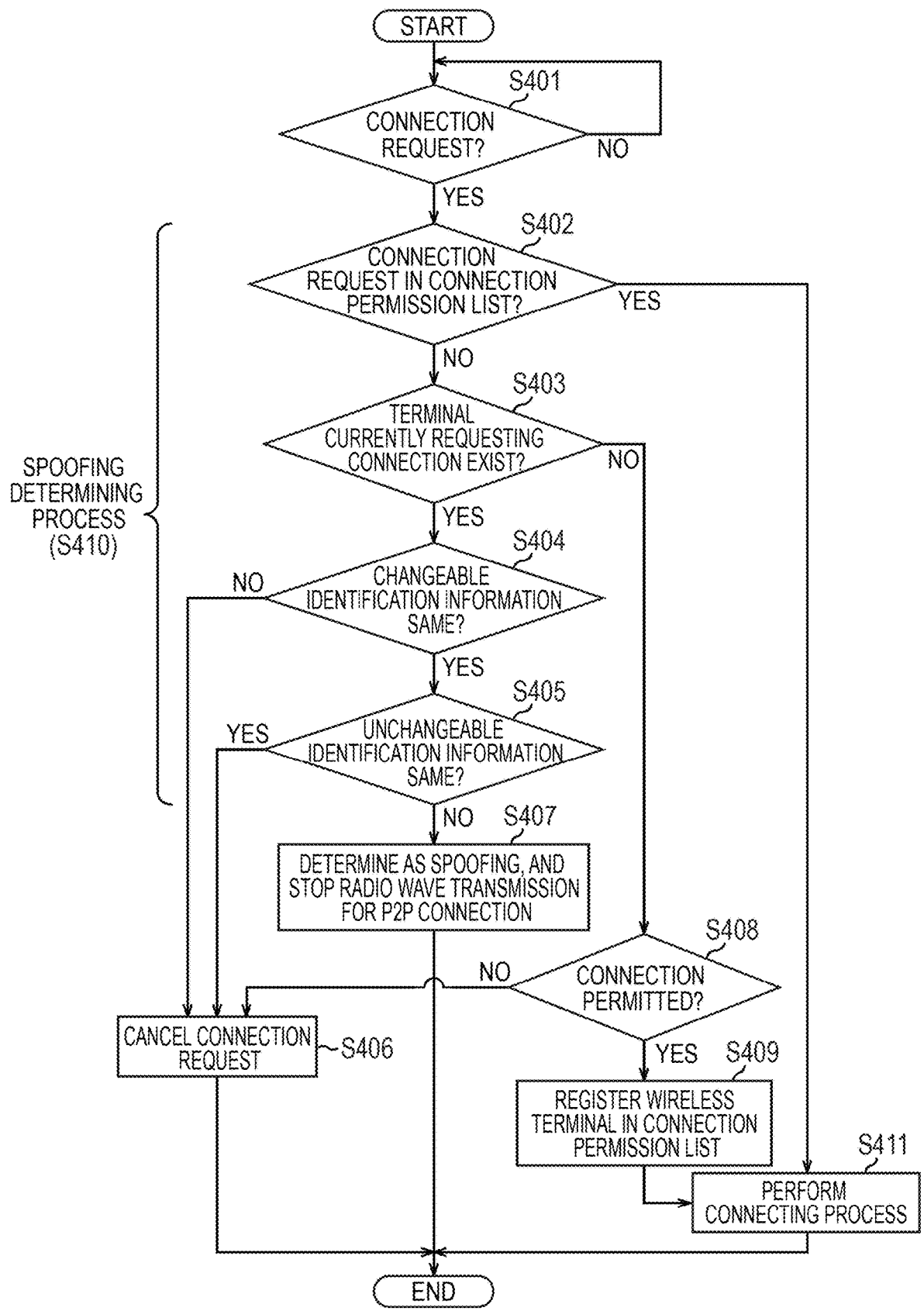
FIG. 4 is a flowchart showing processes of the MFP.

FIG. 4 is a flowchart for describing an example of processes of the MFP 101 at the time of determining whether or not the unauthorized user has spoofed to be an authorized user and issued a connection request to the MFP 101. Each step shown in the flowchart of FIG. 4 is performed by, for example, a method whereby the CPU 211 develops the program stored in the ROM 212 or the like into the RAM 213 and executes it.

As prerequisite conditions, it is assumed that the MFP 101 activates Wi-Fi Direct™ at a start point of time of the flowchart and is in a state where it can receive the connection requests from the wireless terminals 102 to 104. In this state, a screen of the display of the operation unit 215 becomes, for example, a screen 640 illustrated in a right lower region of FIG. 6, which will be described hereinafter. It is assumed that the MAC address of the wireless terminal which is intended to be connected to the MFP 101 has preliminarily been registered in the connection permission list shown in TABLE 1.

The network controlling portion 301 stands by until the connection request in Wi-Fi Direct™ is sent from the wireless terminal (S401). When the connection request in Wi-Fi Direct™ is sent from the wireless terminal, the network controlling portion 301 determines whether or not such a connection request is a connection request from the wireless terminal having the MAC address which has already been registered in the connection permission list (TABLE 1) (S402). As a result of the determination, if the connection request is the connection request from the wireless terminal having the MAC address registered in the connection permission list, the second communication controlling portion 305 performs a Wi-Fi Direct™ connecting process to such a wireless terminal (S411). In the embodiment, for example, an example of a processing unit is realized by using the network controlling portion 301 and the second communication controlling portion 305. That is, S402 and S411 are an example of a case of performing a process for establishing the connection to the external apparatus when the first information of the external apparatus to which the connection request was sent is the same as the first information stored in the storage medium.

On the other hand, if the connection request is not the connection request from the wireless terminal having the MAC address registered in the connection permission list, the network controlling portion 301 determines whether or not the information about the wireless terminal currently receiving the connection request has already been held in the RAM 213 (S403). As a result of the determination, if another connection request is not received yet (if the information about the wireless terminal currently receiving the connection request is not held in the RAM 213), the UI controlling portion 302 displays a UI screen for inquiring the user about a permission or refuse of the connection. The UI screen which is displayed at this time is, for example, a screen 630 illustrated in a left lower region of FIG. 6, which will be described hereinafter. By this UI screen, an identification name (Wi-Fi Direct™ device name) of the wireless terminal which is intended to be connected from now on is presented to the user, thereby inquiring the user about the permission of the connection. On the basis of the operation of the user to this UI screen, the UI controlling portion 302 determines whether or not the connection of the wireless terminal which currently received the connection request in S401 to the MFP 101 is permitted (S408).

As a result of the determination, if the connection of the wireless terminal which currently received the connection request in S401 to the MFP 101 is permitted, the network controlling portion 301 registers such a wireless terminal into the connection permission list (S409). The second communication controlling portion 305 performs the Wi-Fi Direct™ connecting process to such a wireless terminal (S411). In the embodiment, for example, a case where the determination result is NO in S403 corresponds to a case where there are no other connection requests at the time of the connection request from the external apparatus. For example, a case where the determination result is YES in S408 corresponds to a case where a permission of the connection to the external apparatus is instructed by the user of the information processing apparatus. For example, S409 is an example of the case where the first information of the external apparatus is registered into the storage medium. For example, S411 is an example of the case where the process for establishing the connection to the external apparatus is performed.

On the other hand, if the connection of the wireless terminal which currently received the connection request in S401 to the MFP 101 is not permitted, the network controlling portion 301 cancels the connection request currently received in S401 (S406).

If another connection request has already been received in S403 (the information about the wireless terminal currently receiving the connection request has been held in the RAM 213), the processing routine advances to S404. The network controlling portion 301 determines whether or not changeable identification information included in those connection requests is the same (or identical). That is, the network controlling portion 301 determines whether or not the Wi-Fi Direct™ device name included in the connection request received in S401 coincides with the Wi-Fi Direct™ device name of the wireless terminal currently receiving the connection request which has been held in the RAM 213 (S404). In the embodiment, for example, S404 is an example of a case of determining whether or not the second information obtained in each of the plurality of connection requests coincides.

As a result of the determination, if those Wi-Fi Direct™ device names do not coincide, although the connection request currently received in S401 is not the connection request by spoofing, the connection request has already been received from another wireless terminal. Therefore, the network controlling portion 301 cancels the newly received connection request (connection request currently received in S401) (S406).

If those Wi-Fi Direct™ device names coincide, there is a possibility that the connection request currently received in S401 is the connection request by spoofing. Therefore, the network controlling portion 301 determines whether or not unchangeable identification information of those wireless terminals is the same. That is, the network controlling portion 301 determines whether or not the MAC address of the wireless terminal which transmitted the connection request received in S401 coincides with the MAC address of the wireless terminal currently receiving the connection request stored in the RAM 213 (S405). In the embodiment, for example, S405 is an example of a case of determining whether or not the first information obtained in each of the plurality of connection requests coincides. A case where S405 is performed after S404 is an example of a case where after it was determined that the second information obtained in each of the plurality of connection requests coincides, whether or not the first information obtained in each of the plurality of connection requests coincides is determined.

If those MAC addresses coincide as a result of the determination in S405, the wireless terminal which transmitted the connection request currently received in S401 is the same as the wireless terminal which transmitted the connection request received in S401 at the previous time. Thus, the connection request currently received in S401 is not the connection request by spoofing. Therefore, the network controlling portion 301 cancels the newly received connection request (connection request currently received in S401) (S406).

If those MAC addresses do not coincide, the network controlling portion 301 decides that the connection request currently received in S401 is the connection request by spoofing. In this case, the network controlling portion 301 performs a process for disabling the wireless terminal which transmitted the connection request currently received in S401 to detect the MFP 101. Specifically speaking, in the embodiment, the network controlling portion 301 stops a transmission of radio waves for the Wi-Fi Direct™ connection (P2P connection) to the wireless terminal which transmitted the connection request currently received in S401 (S407). In the embodiment, for example, S407 is an example of a case of performing a process corresponding to the unauthorized connection request on the assumption that among the connection requests from the plurality of external apparatuses, the connection requests other than the connection request which was made first are the unauthorized connection requests. S407 is also an example of the process for preventing that the connection to the external apparatus which made the connection request is established. S407 is also an example of the process for shutting off a communication with the external apparatus which made the connection request. For example, the processes according to the flowchart of FIG. 4 are an example of the process about the connection by the wireless communication with the external apparatus which is performed without passing through the access point.

In the following description, a former half portion (S402 to S405) of the flowchart of FIG. 4, that is, a portion for determining about the spoofing is called a spoofing determining process (S410) in accordance with necessity.

In FIG. 4, as a countermeasure (S407) to the case where the connection request currently received in S401 is the connection request by spoofing, the stop of the radio wave transmission has been described as an example. However, the countermeasure to the case where the connection request currently received in S401 is the connection request by spoofing is not limited to such an example.

For example, the connection request may be cancelled. By doing such an operation, an example of the process for preventing that the connection to the external apparatus which made the connection request is established is realized. A message showing that the connection requests were received from a plurality of wireless terminals having the same identification name (Wi-Fi Direct™ device name) may be notified to the user by a method whereby it is displayed on the display of the operation unit 215 or the like. By doing such an operation, an example of the process for notifying the information showing the reception of the connection requests is realized. With respect to the wireless terminal to which the connection request (by spoofing) was made, in addition to the changeable identification information (Wi-Fi Direct™ device name), the unchangeable identification information (MAC address) may be displayed together on the display of the operation unit 215. By doing such an operation, an example of the process for notifying the first information and the second information about the external apparatus which made the connection request is realized.

<Sequence in which MFP 101 Performs Spoofing Process>

Figure 5:
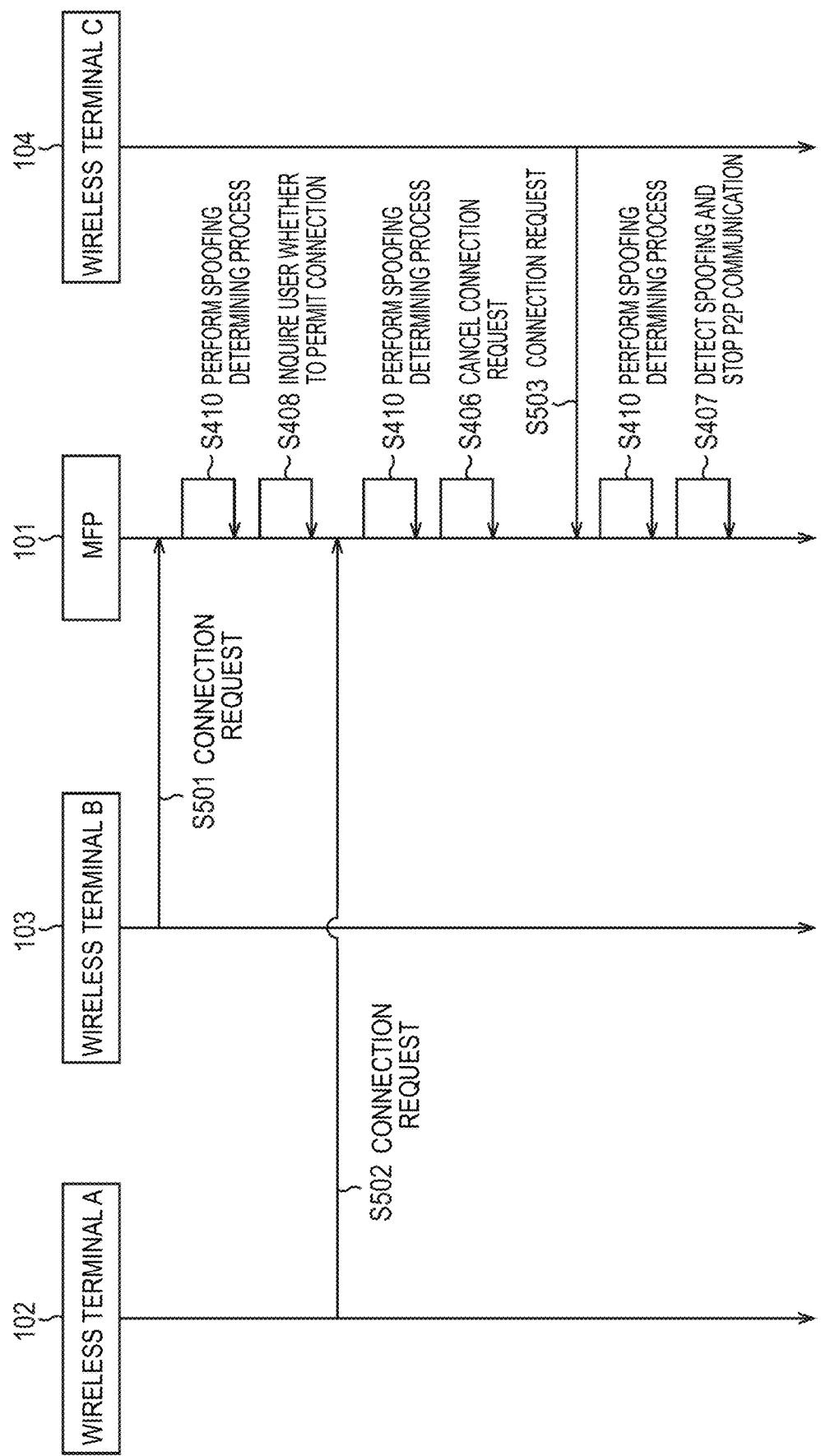
FIG. 5 is a diagram illustrating processes of the MFP in the case where there are connection requests from a plurality of wireless terminals.

FIG. 5 is a diagram illustrating an example of a sequence at the time of determining whether or not the unauthorized user spoofs to be an authorized user and makes a connection request to the MFP 101 when the connection requests are received from the plurality of wireless terminals 102 to 104.

First, when the connection request is received from the wireless terminal 103 (wireless terminal B) used by the authorized user in S501 (refer to YES in S401), the MFP 101 performs the spoofing determining process (S410). At this stage, the MFP 101 does not receive other connection requests yet (refer to NO in S403). Therefore, the MFP 101 performs the UI control for inquiring the user about a permission or refuse of the connection (S408).

Subsequently, when the connection request is received from the wireless terminal 102 (wireless terminal A) used by another authorized user in S502 (refer to YES in S401), the MFP 101 performs the spoofing determining process (S410). At this time, the changeable identification information (Wi-Fi Direct™ device name) included in the connection request received in S401 at the previous time and the changeable identification information (Wi-Fi Direct™ device name) included in the connection request currently received in S401 differ (refer to NO in S404). That is, the Wi-Fi Direct™ device name included in the connection request received in S401 at the previous time is "Mobile Device B"

(refer to TABLE 2). The Wi-Fi Direct™ device name included in the connection request currently received in S401 is "Mobile Device A" (refer to TABLE 2). Therefore, the MFP 101 cancels the connection request currently received in S401 (connection request from the wireless terminal 102 (wireless terminal A)) (S406).

Lastly, the MFP 101 receives the connection request from the wireless terminal 104 (wireless terminal C) used by the unauthorized user in S503 (refer to YES in S401). The changeable identification information (Wi-Fi Direct™ device name) of the wireless terminal 104 (wireless terminal C) and that of the wireless terminal 103 (wireless terminal B) coincide (refer to YES in S404). Both of the unchangeable identification information (MAC addresses) of them differ (refer to NO in S405). Therefore, the MFP 101 decides that in the spoofing determining process (S410), the connection request currently received in S401 is the connection request in which the wireless terminal 104 (wireless terminal C) was spoofed to be the wireless terminal 103 (wireless terminal B). Therefore, the MFP 101 performs the stop of the radio waves for the Wi-Fi Direct™ communication (S407).

<Local User Interface of MFP 101>

Figure 6:
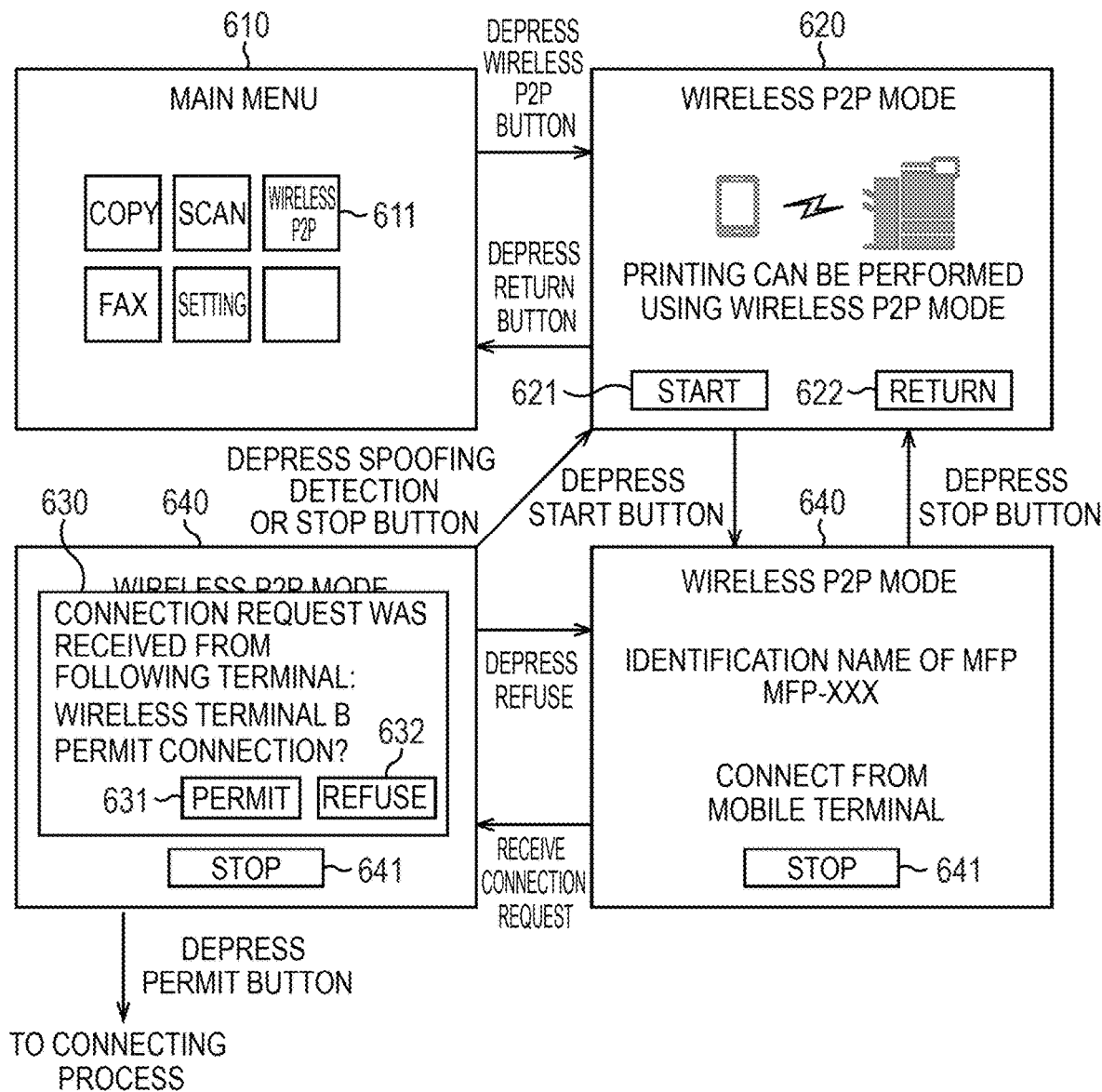
FIG. 6 is a diagram illustrating a local user interface of the MFP.

FIG. 6 is a diagram illustrating a transition of a local user interface of the MFP 101 accompanied with the spoofing determining process. The screens 610, 620, 630, and 640 illustrated in FIG. 6 are, for example, GUI (graphical user interfaces) which are displayed to the display of the operation unit 215.

In the main menu screen 610, when a button 611 is depressed by the user, the screen 620 to perform the connection by Wi-Fi Direct™ is displayed. In an example illustrated in FIG. 6, a message showing that the connection by Wi-Fi Direct™ can be performed, a start button 621, and a return button 622 are displayed on the screen 620. In the screen 620, when the start button 621 is depressed by the user, the MFP 101 accepts the connection request by Wi-Fi Direct™. When the return button 622 is depressed by the user, the main menu screen 610 is displayed again.

When the start button 621 is depressed by the user and Wi-Fi Direct™ is activated, the screen 640 is displayed. Information necessary for the wireless terminal to send the connection request is displayed on the screen 640. In the example illustrated in FIG. 6, an identification name of the MFP 101, a message showing that it is necessary to connect to the MFP 101 from the wireless terminal, and a stop button 641 are displayed on the screen 640.

When the screen 640 is displayed, if the first connection request is received from the wireless terminal (refer to YES in S401), the screen 630 is pop-up displayed (S408). The screen 630 is a screen for inquiring the user about a permission or refuse of the connection of the wireless terminal. In the example illustrated in FIG. 6, the wireless terminal B serving as changeable identification information (Wi-Fi Direct™ device name) of the wireless terminal which made the connection request, a permit button 631, and a refuse button 632 are displayed on the screen 630. When the permit button 631 is depressed by the user, the MFP 101 registers the wireless terminal to which the connection request was made into the connection permission list (S409) and performs the Wi-Fi Direct™ connecting process to such a wireless terminal (S411). When the refuse button 632 is depressed by the user, the MFP 101 does not perform the Wi-Fi Direct™ connecting process to such a wireless terminal.

When the connection request is further received in this state of the screen 630, if this connection request is not the connection request by spoofing (S406), the screen is not shifted but the screen 630 is maintained as it is. If such a connection request is the connection request by spoofing (S407) or if the stop button 641 is depressed by the user, the screen 620 is displayed again.

As mentioned above, in the embodiment, a list of the MAC addresses of the wireless terminals connected to the MFP 101 is registered as a connection permission list into the MFP 101. After that, when there is a connection request from the wireless terminal in which the Wi-Fi Direct™ device name is the same as that of the wireless terminal currently receiving the connection request and the MAC address differs from that of such a wireless terminal, the MFP 101 does not accept such a connection request. Therefore, in the connection authentication at the time of the wireless communication, when there is a connection request from the wireless terminal having a suspicion of spoofing, such a countermeasure that such a connection request is cancelled, the wireless communication with such a wireless terminal is stopped, or the like can be performed. Consequently, for example, such a situation that security information or assets of a company leak can be suppressed.

In the embodiment, when there is a connection request from the wireless terminal in a state where the connection request is not received and a permission of the connection of such a wireless terminal is instructed from the user, the MFP 101 adds the MAC address of this wireless terminal into the connection permission list. Therefore, the MFP 101 can dynamically increase the number of MAC addresses of the wireless terminals which are used by the authorized user. Thus, for example, such a situation that the connection request from the wireless terminal used by the authorized user is erroneously determined as a connection request by spoofing can be suppressed.

The foregoing embodiments are nothing but specific examples when embodying the present invention and a technical scope of the invention should not be limitedly interpreted by them. That is, the invention can be embodied in various forms without departing from its technical idea or its principal feature. For example, all of combinations of the features in the foregoing embodiments are not always indispensable for solving the subjects of the invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-102564, filed May 24, 2017, which is hereby incorporated by reference herein in its entirety.

What is claimed is:

1. An information processing apparatus including a first communication interface configured to receive a wireless connection request from an external apparatus, the information processing apparatus comprising:
   one or more processors configured to implement instructions stored in a memory and execute a plurality of tasks, including:
      a first receiving task that receives a first wireless connection request from a first external apparatus, in a state where the information processing apparatus is set to accept a wireless connection request from the external apparatus;
      a displaying task that causes a display device to display a screen for receiving a user selection about whether or not a wireless connection to the first external apparatus is to be performed, upon the first receiving task receiving the first wireless connection request;
      a second receiving task that receive a second wireless connection request from a second external apparatus, in a state where the screen for receiving the user selection is displayed and the information processing apparatus is set to accept a wireless connection request from the external apparatus;
      a first determining task that determines whether or not a device name of the first external apparatus included in the first wireless connection request received by the first receiving task and a device name of the second external apparatus included in the second wireless connection request received by the second receiving task coincide;
      a second determining task that determines whether or not a MAC address of the first external apparatus included in the first wireless connection request received by the first receiving task and a MAC address of the second external apparatus included in the second wireless connection request received by the second receiving task coincide;
      a state shifting task that, in a case where the first determining task determines that the device names coincide and the second determining task determines that the MAC addresses do not coincide, shifts the information processing apparatus to a state where the first wireless connection request and the second wireless connection request are not accepted; and
      continuing task that continues to cause the display device to display the screen for receiving a user selection about whether or not a wireless connection to the second external apparatus is to be performed, in a case where the first determining task determines that the device names coincide and the second determining task determines that the MAC addresses coincide.

2. The information processing apparatus according to claim 1, further comprising:
   a second communication interface,
   wherein, in a case where the first determining task determines that the device names coincide and the second determining task determines that the MAC addresses coincide, the second communication interface is configured to perform the wireless connection to the second external apparatus.

3. The information processing apparatus according to claim 1, wherein the displaying task causes the display device to display on the screen a device name of the first external apparatus.

4. The information processing apparatus according to claim 1, wherein the plurality of tasks include a controlling task that stops a radio wave transmission for communicating with the external apparatus in a case where the first determining task determines that the device names coincide and the second determining task determines that the MAC addresses do not coincide.

5. A controlling method for an information processing apparatus including a communication interface configured to receive a wireless connection request from an external apparatus, the controlling method comprising:
   a first receiving step of receiving a first wireless connection request from a first external apparatus, in a state where the information processing apparatus is set to accept a wireless connection request from the external apparatus;
   a displaying step of causing a display device to display a screen for receiving a user selection about whether or not a wireless connection to the first external apparatus is to be performed, upon the first receiving step receiving the first wireless connection request;
   a second receiving step of receiving a second wireless connection request from a second external apparatus, in a state where the screen for receiving the user selection is displayed and the information processing apparatus is set to accept a wireless connection request from the external apparatus;
   a first determining step of determining whether or not a device name of the first external apparatus included in the first wireless connection request received in the first receiving step and a device name of the second external apparatus included in the second wireless connection request received in the second receiving step coincide;
   a second determining step of determining whether or not a MAC address of the first external apparatus included in the first wireless connection request received in the first receiving step and a MAC address of the second external apparatus included in the second wireless connection request received in the second receiving step coincide;
   a state shifting step of, in a case where the first determining step determines that the device names coincide and the second determining step determines that the MAC addresses do not coincide, shifting the information processing apparatus to a state where the first wireless connection request and the second wireless connection are not accepted; and
   continuing step of continuing to cause the display device to display the screen for receiving a user selection about whether or not a wireless connection to the second external apparatus is to be performed, in a case where the first determining step determines that the device names coincide and the second determining step determines that the MAC addresses coincide.

6. A non-transitory computer-readable storage medium storing a program executable by a computer to execute a controlling method for an information processing apparatus including a communication interface configured to receive a wireless connection request from an external apparatus, the controlling method comprising:
- a first receiving step of receiving a first wireless connection request from a first external apparatus, in a state where the information processing apparatus is set to accept a wireless connection request from the external apparatus;
- a displaying step of causing a display device to display a screen for receiving a user selection about whether or not a wireless connection to the first external apparatus is to be performed, upon the first receiving step receiving the first wireless connection request;
- a second receiving step of receiving a second wireless connection request from a second external apparatus, in a state where the screen for receiving the user selection is displayed and the information processing apparatus is set to accept a wireless connection request from the external apparatus;
- a first determining step of determining whether or not a device name of the first external apparatus included in the first wireless connection request received in the first receiving step and a device name of the second external apparatus included in the second wireless connection request received in the second receiving step coincide;
- a second determining step of determining whether or not a MAC address of the first external apparatus included in the first wireless connection request received in the first receiving step and a MAC address of the second external apparatus included in the second wireless connection request received in the second receiving step coincide;
- a state shifting step of, in a case where the first determining step determines that the device names coincide and the second determining step determines that the MAC addresses do not coincide, shifting the information processing apparatus to a state where the first wireless connection request and the second wireless connection request are not accepted; and
- a continuing step of continuing to cause the display device to display the screen for receiving a user selection about whether or not a wireless connection to the second external apparatus is to be performed, in a case where the first determining step determines that the device names coincide and the second determining step determines that the MAC addresses coincide.

* * * * *